United States Patent [19]
Albelda et al.

[11] Patent Number: 5,925,257
[45] Date of Patent: Jul. 20, 1999

[54] METHOD AND APPARATUS FOR REMOVING BIOFILM FROM AN AQUEOUS LIQUID

[76] Inventors: David Albelda, 5 Franklin Ave., White Plains, N.Y. 10601; Kafri Moshe, Beit Yeoshua, Israel, 40591

[21] Appl. No.: 08/937,954

[22] Filed: Sep. 25, 1997

Related U.S. Application Data

[60] Provisional application No. 60/027,110, Sep. 27, 1996.
[51] Int. Cl.$^6$ ................................. C02F 1/32; C02F 1/72
[52] U.S. Cl. ......................... 210/748; 210/758; 210/764; 210/198.1; 433/80
[58] Field of Search ......................... 210/86, 101, 198.1, 210/748, 758, 764; 433/80

[56] References Cited

U.S. PATENT DOCUMENTS

| | | | |
|---|---|---|---|
| 4,585,482 | 4/1986 | Tice et al. ............................. | 106/15.05 |
| 4,929,365 | 5/1990 | Clark et al. .............................. | 210/764 |
| 5,032,292 | 7/1991 | Conrad ..................................... | 210/764 |
| 5,526,841 | 6/1996 | Detsch et al. ............................. | 137/15 |
| 5,556,279 | 9/1996 | Wolf et al. ................................ | 433/82 |
| 5,584,992 | 12/1996 | Sugimoto ................................. | 210/169 |
| 5,731,275 | 3/1998 | Prevost et al. ........................... | 510/161 |

*Primary Examiner*—Jay H. Woo
*Assistant Examiner*—Betsey J. Morrison
*Attorney, Agent, or Firm*—Ohlandt, Greeley, Ruggiero & Perle

[57] ABSTRACT

A method for removing biofilm from the interior surface of a conduit and for preventing biofilm from forming on the interior surface as a result of flow of an aqueous liquid through the conduit. This method includes the step of contacting the aqueous liquid with an oxygen solution in an amount sufficient to remove biofilm from and prevent the formation of biofilm on the interior surface of the conduit. A preferred oxygen solution comprises about 0.2% by weight of stabilized electrolytes of oxygen.

14 Claims, 1 Drawing Sheet

METHOD AND APPARATUS FOR REMOVING BIOFILM FROM AN AQUEOUS LIQUID

This application claims the benefit of U.S. Provisional Application Ser. No. 60/027,110, filed Sep. 27, 1996.

The present invention relates generally to a method and apparatus for removing and preventing biofilm formation in conduits or tubing used to transport aqueous liquids, such as water or tap water, to a dental instrument or handpiece. This unique system can include: (a) a main shut-off valve; (b) a replaceable integrated water filtration and sterilization cartridge and housing assembly which is capable of removing particulates, organic materials, inorganic materials and/or heavy metal materials from a water stream, while also sterilizing the filtered water stream to destroy most microorganisms, bacteria and viruses contained therein; and (c) a means for injecting an oxygen solution containing about 0.2% by weight oxygen into the filtered, sterilized or purified water, thereby eliminating the formation of biofilm in the water supplied to dental instruments or other devices requiring uncontaminated water.

BACKGROUND OF THE INVENTION

As environmental agencies become more aware of the potential health risks associated with using either municipal or well water in sterile environments such as dental offices, there has been an every increasing need for water purification systems which are capable of removing organics, inorganics, particulates, microorganisms, bacteria and viruses from the water supply prior to use on or in the patient. Most conventional filtration systems require a series of filtration and chlorination units to properly remove such matters from the water. These units are extremely costly to install and maintain, and take up a lot of space making them unfit for use in dental offices.

Filtration media have been used for years to remove particulates from the water supply, while carbon block filters have been effective in removal of organics and inorganics. However, conventional filters are incapable of removing microorganisms such as bacteria, viruses, yeasts or molds. Ultraviolet radiation in the 200–300 nanometer range have been extremely effective in killing such microorganisms. As such, germicidal lamps have been used extensively in air and water purification, sewage treatment, protection of food and beverages, and other disinfecting and sterilization applications.

Recent efforts by filtration manufacturers have resulted in the creation of a water purification system which combines the disinfecting and sterilization capabilities of ultraviolet radiation with the particulate, organic and inorganic filtering capabilities of conventional filter media. This combined system provides extremely pure and sterilized, purified, water regardless of the origin of the water source.

These conventional two stage water purification systems typically include an ultraviolet lamp affixed to the base unit of a filtration housing assembly and protected by a stainless steel sheath or sleeve. A conventional carbon block filter is removably slid over the outside of the sleeve and then the filter housing is placed over the carbon filter and screwed into the base. Typically, the ultraviolet lamp is placed within a quartz tube and replaceably mounted to the base.

One major problem with the use of any filtration system in dental offices is the formation of biofilm. In The New York State Dental Journal, December 1995, Vol. 61, No. 10, issue it was stated that "We believe the only way to lower bacterial counts in the water that feeds handpieces to acceptable levels is to eliminate the biofilm and prevent its return."

A network of small diameter water lines used in feeding dental handpieces and air-water pistols can become coated with a fine layer of bacteria called a biofilm. This biofilm forms naturally as a result of stagnation of contaminated water inside these small, flexible tubes. The adherence of certain species is facilitated by microscopic imperfections on the internal surfaces of the water lines which allow bacterial adsorption and which in turn initiates the formation of the biofilm.

The closely packed bacteria are held in place by a matrix of polysaccharides and glycoproteins. The attached bacteria, which are not easily flushed out, proliferate and produce a matrix, which in turn allows the establishment of other species of bacteria. The biofilm becomes populated with a greater and greater variety of bacteria; it also protects the bacteria during their growth by retaining nutritional material and by allowing a higher level of metabolic activity, all the while protecting the bacteria from biocidal substances. The biofilm gradually becomes visible to the naked eye and can eventually partially obstruct the lumen of the water line.

The conventional way of eliminating biofilm is to fill the water lines with a disinfectant at the end of each day, allowing over-night treatment of the water lines. At the beginning of the day the disinfectant is drained and water flows through cleaned water lines. This avoids contact of the disinfectant with the patient and allows the regular water supply to be used in the dental unit. Although this form of treatment is generally effective, over time, biofilm begins to form in the crevices of the tubing and cannot typically be removed by treatment with disinfectants. Furthermore, the use of disinfectant is both costly and time consuming. Also, there is a potential risk that a portion of the disinfectant cannot be removed from the lines and is transported to the dental handpiece and into the patient's mouth.

The unique system according to the present invention provides an extremely inexpensive and efficient means for removing particulates, organic materials, inorganic materials, heavy metal materials, microorganisms, bacteria and viruses contained within an aqueous liquid, for example, water, supplied to a dentist's water supply system, while also eliminating the formation of biofilm in the tubes used to carry water to the dental units or handpieces. The present invention preferably accomplishes this by providing a filtration and/or sterilization, i.e., purification system which preferably includes both an ultraviolet water filtration and sterilization unit in conjunction with means for contacting the filtered and/or sterilized, i.e., purified aqueous liquid, e.g., water, with at least about 0.2 wt. % of an oxygen solution.

The present invention also provides many additional advantages which shall become apparent as described below.

SUMMARY OF THE INVENTION

The present invention comprises a method and apparatus for removing biofilm from the interior surface of a conduit and for preventing biofilm from forming on the surface as a result of flow of an aqueous liquid through the conduit. The method comprises contacting the aqueous liquid with an oxygen solution in an amount sufficient to remove biofilm from and prevent the formation of biofilm on the surface of the conduit. Preferably, the method includes filtering and/or exposing the aqueous liquid to ultraviolet radiation prior to contacting it with the oxygen solution, and the oxygen solution contains stabilized electrolytes of oxygen and comprises at least about 0.2% by weight oxygen.

The contacting step can include flowing the aqueous liquid at an average rate of about 100 ml/min. and adding to the flowing aqueous liquid at least about 0.43 ml of oxygen solution every accumulated total of twenty (20) seconds of flow of the aqueous liquid through the conduit. The contacting step can be effected by adding the oxygen solution under pressure, for example, by injecting the 0.43 ml of oxygen solution into the aqueous liquid for a period of about two (2) seconds per twenty (20) seconds of flow of the aqueous liquid.

The apparatus comprises a conduit having an interior surface for feeding an aqueous liquid therethrough, and means for contacting the aqueous liquid with an oxygen solution in an amount sufficient to remove biofilm from and prevent formation of biofilm on the surface. The apparatus can include filtering means in communication with the conduit for filtering the aqueous liquid, and preferably also means for exposing the filtered liquid to ultraviolet radiation, prior to the liquid being contacted with the oxygen solution. The means for contacting the aqueous liquid can include means for providing the oxygen solution, flow control means connected to the means for providing the aqueous liquid and to the conduit, for controlling and regulating the flow of the oxygen solution to the conduit, and flow monitoring means in communication with the conduit, for monitoring flow of aqueous liquid through the conduit, and for signaling the flow control means to indicate the period(s) of flow of aqueous liquid through the flow monitoring means, the flow control means being adapted to provide the oxygen solution to the conduit based on the signal(s) received from the flow monitoring means.

The contacting means can also include means in communication with the flow monitoring means and the flow control means for receiving the signal(s) from the flow monitoring means and for timing and controlling the amount of oxygen solution allowed by the flow control means to flow to the conduit. The timing and controlling means is adapted for timing, counting and accumulating the duration of such periods of flow of aqueous liquid through the flow monitoring means, and is adapted such that, upon a desired set total of accumulated time of duration of flow, it signals the flow control means to allow flow of oxygen solution for a set desired time to the conduit to contact the aqueous liquid flowing therethrough.

The apparatus preferably includes a means for exposing the filtered aqueous liquid to ultraviolet radiation prior to contacting the aqueous liquid with the oxygen solution. The means for providing the oxygen solution can be a container in which the oxygen solution is pressurized sufficiently to inject the solution into the conduit. The oxygen solution preferably contains stabilized electrolytes of oxygen and is comprised of at least about 0.2% by weight oxygen. The apparatus can also include indicator means in communication with the container for indicating when the container no longer is capable of providing pressurized oxygen solution as desired to the conduit. The indicator means preferably comprises an indicator light and pressure monitoring means in communication therewith for monitoring the amount of pressure within the container and for indicating to the indicator when the pressure within the container is at or below a certain level.

Other and further objects, advantages and features of the present invention will be understood by reference to the following specification in conjunction with the annexed drawing.

DESCRIPTION OF THE PREFERRED EMBODIMENTS

Figure 1:
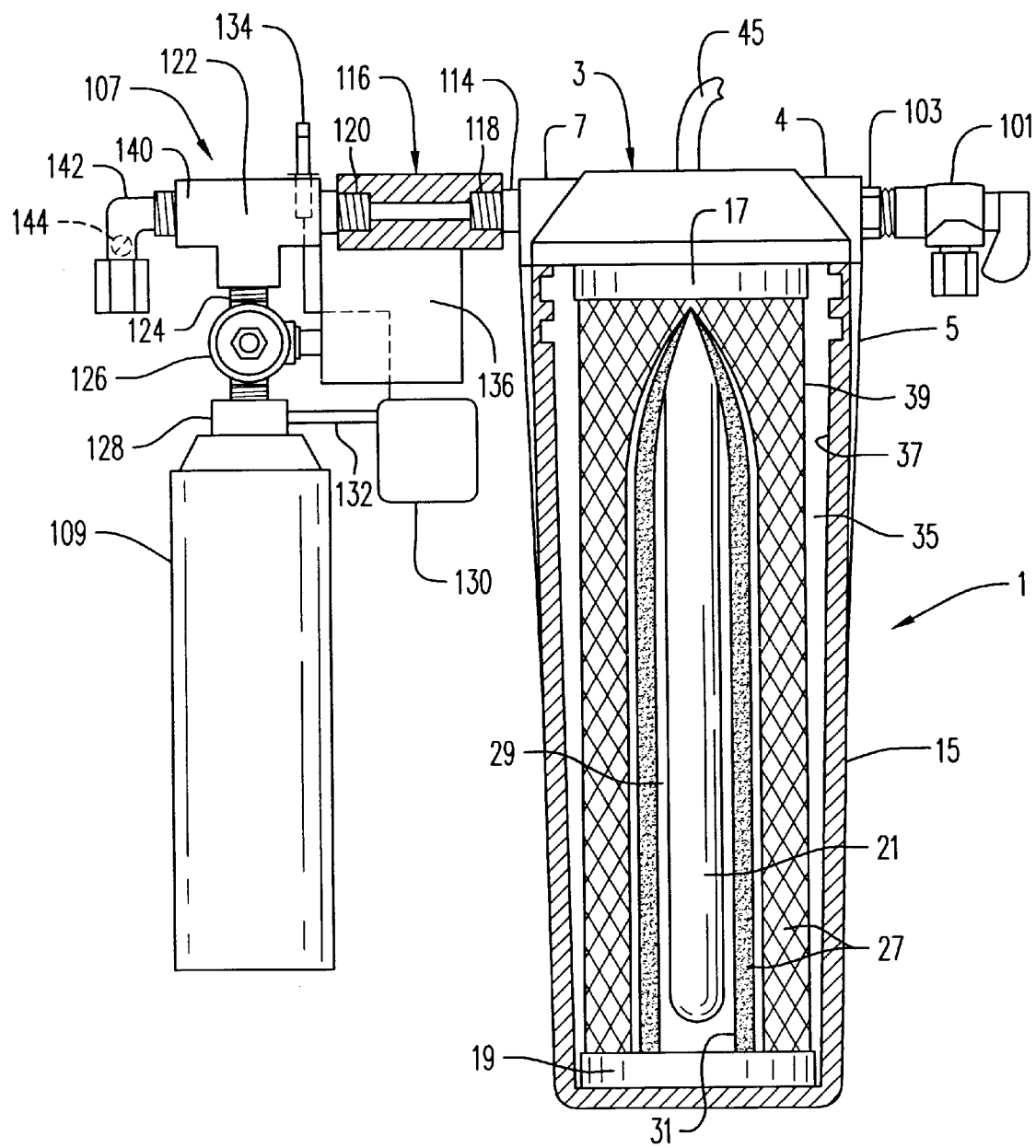
FIG. 1 is a schematic front perspective view of a preferred aqueous liquid purification system according to the present invention wherein the front portion of the filtration/sterilization housing assembly has been removed for viewing of the interior thereof.

The present invention can best be described by referring to the drawings attached hereto wherein FIG. 1 depicts a system according to the present invention comprising a main shut-off or ball valve 101 connected to filtration housing 1 by means of a hex nipple 103. Filtration housing 1 comprises a base unit 3 and an outer housing 5. Base unit 3 comprises a feed port 4 and a permeate port 7.

An integrated filtration and sterilization cartridge 15 can best be shown by reference to FIG. 1, wherein cartridge 15 comprises: a first end plate 17 and a second end plate 19; an ultraviolet lamp 21 affixed to first end plate 17; and a filtration member 27 disposed between first and second end plates (17,19). The filtration member is preferably affixed to both first and second end plates (17,19) and disposed about ultraviolet lamp 21 thereby forming a permeate chamber 29 between ultraviolet lamp 21 and inner surface 31 of filtration member 27.

End plates (17,19) may be formed of any of the following materials: thermoplastic resin (e.g., polypropylene, nylon or ABS), thermosetic (e.g., epoxy, polyurethane or polyester), elastomeric materials, and metal (e.g., steel, aluminum or stainless steel). End plates (17,19) may be connected affixed to filtration member 27 by glue, non-toxic chemical adhesives, hot melting, or thermosetic adhesion. Alternatively, end plates (17,19) may be formed in-situ about opposite ends of filtration member 27 by hot melting, injection molding, compression molding or potting.

Outer housing 5 is disposed about integrated filtration and sterilization cartridge 15 so as to form a feed chamber 35 between inner surface 37 of outer cartridge 15 and outer surface 39 of filtration member 27 and wherein feed chamber 35 is in contact with feed port 4 of base unit 3.

Base unit 3 also includes a means for supplying power to ultraviolet lamp 21 via electric cable 45. Means for supplying power can be a modular or snap-type socket such that electric cable 45 can be easily unplugged from means for supplying power so that cartridge 15 can be readily removed from base 3 upon removal of outer housing 5.

Cartridge 15 may also include a counter current sleeve, not shown, disposed between ultraviolet lamp 21 and inner surface 31 of filtration member 27. This counter current sleeve can be formed from any of the following: stainless steel, Teflon ® (a registered trademark of duPont), any ultraviolet-resistant polymeric material, and the like. Ultraviolet lamp 21 is preferably disposed within a protective quartz tube. Ultraviolet lamp 21 should be one which is capable of producing radiation in the 200–300 nanometer range in order to effectively kill most microorganisms such as airborne and surface bacteria, viruses, yeasts and molds.

Ultraviolet lamp 21 may be any lamp that generates germicidal ultraviolet emission such as a low pressure mercury lamp. The protective quartz tube may have one end opened, both ends opened, or both ends closed. Instead of quartz, the protective tube may be formed from hard glass, soft glass, transparent or translucent ultraviolet resistant plastic (e.g., polytetrafluoroethylene, polyvinylfluoride or polycarbonate).

The protective tube may be sealed to either end plate or to both end plates. The end plates can be sealed about either the inner wall, outer wall or both of the protective tube. The sealing is accomplished by any conventional sealing means such as (1) an elastomeric seal (e.g., at least one o-ring, a grommet, a gland, or a mechanical seal), (2) a packing such as gland packing or a mechanical seal, (3) compression fitting such as a Swagelock™ or similar fitting where a compression right is made of any suitable polymeric, elastomeric or metallic material, or (4) any type of non-toxic chemical adhesive, potting, hot melt or thermosetic material.

Filter member 27 is typically affixed to first and second end plates (17,19) by means of any chemical adhesive material, although any mechanical or other conventional means of securing filter member 27 to first and second end plate (17,19) is also contemplated herein. Filter member 27 can be formed from at least one material selected from the group consisting of: activated carbon, adsorption resins, ion exchange resins, zeolite, reduction catalysts, paper, polymers, clay, ceramics, metals, nylon, wood pulp, cellulose, cotton, fibers, and any other material capable of separating particulates, organics or inorganics from a feed stream. Filter member 27 is preferably in the form of one of the following: string wound filter, fiber composite molded filter, pleated filter, hollow fiber membrane, spiral wound membrane, plate and frame membrane and any other conventional form desired by the user.

When filter member 27 is used to remove organic materials, such as benzene, it is preferably formed of activated carbon or adsorption resin. To remove inorganic materials, such as heavy metal or sulfites, filter 27 should be formed from ion exchange resin, zeolite or a reduction catalyst.

The oxygen solution injector generally designated 107 is connected to the permeate port 7 of filtration housing 1 such that at least about 0.2 wt. % of oxygen solution contained in a pressurized canister or container 109 is continually or continuously fed into the aqueous liquid or water filtered by filtration housing 1, thereby eliminating any biofilm which may form in the water lines (not shown) which are connected from injector 107 to the dental handpieces (not shown).

A preferred oxygen solution injection system or apparatus for dental handpieces such as water-cooled drills is shown in the drawings. More particularly, the drawings show a first connector pipe 114 in communication with permeate port 7 and with flow monitoring means, here shown as a flow switch 116 which need not include, but here includes a pair of adapters 118, 120, the first positioned at the input end of the switch for reducing flow, here, from a ¼ inch internal diameter line to a ⅛ inch internal diameter line 119, and the second for enlarging the internal flow diameter back to a ¼ inch diameter.

The flow switch monitors flow and non-flow through the conduit and provides a signal which indicates flow of filtered, sterilized, i.e. purified water, therethrough. A suitable flow switch, available from Malema Engineering Corporation and sold as Model No. M-50-4-P-SS, is adapted to sense a flow of 50 ml/min. therethrough. However, any suitable flow switch can be employed, and for the embodiment shown, it need not be a 50 mil/min. switch. The sensing capacity of the switch should be sufficiently below the average rate of flow of the water system being treated so that the switch will be operative for the least expected flow through the system. For the embodiment shown for use in relation to dental handpieces, which have been found to have an average of 100 ml/min. flow, a 50 mil/min. sensing capacity flow switch is preferred since its sensing capacity is safely below the minimum flow expected to be employed by such dental pieces.

The flow switch 116 is connected at its output end through a connector pipe to a conduit, here, the right input arm of a ¼ inch T-shaped joint pipe 122 whose base arm is connected as by a ¼ inch connector nipple 124 to suitable flow control means, e.g. a valve, here shown as a metering solenoid valve 126. The solenoid valve when closed prevents, and when opened allows flow of aerobic oxygen solution from container 109 therethrough. The valve is for controlling and metering or regulating the time, amount or rate of flow of aerobic oxygen solution that is to be allowed to flow therethrough from container 109 to the conduit. For feeding water to a dental handpiece, a 24-volt metering solenoid valve has been found suitable. Valve 126 is connected through a ¼ inch nipple and an adapter 128 to a suitable source of oxygen solution, e.g. a container which can be or include a canister, here the 3 oz. container 109 which contains an oxygen solution under pressure.

A suitable 3 oz. container capable of providing pressurized oxygen solution for this embodiment is available from U.S. Can Company of Oak Brook, Ill. The oxygen solution is packaged within, for example, a flexible bag, pouch or other container which is retained within the 3 oz. container. Pressure is provided between the outer and inner containers. Suitable indicator means, such as including pressure sensing means, e.g., an air logic pressure switch, here generally designated 130, are in communication with the interior of container 109 through suitable means such as line 132 which communicates with the interior of adapter 128. The indicator means also includes at least one suitable indicator 134. The pressure switch monitors the amount of pressure within container 109, and provides a signal to indicator 134 which indicates for example visually and/or audibly to a user when the pressure within the bottle reaches or falls below a certain level. Here, pressure switch 130 is selected or set to indicate when pressure in container 109 is 40 psi, since at 40 psi the bottle no longer contains or no longer will provide aerobic oxygen solution. The pressure switch can be selected or set to indicate a desired higher level of pressure as a warning that the bottle is close to or approaching 40 psi. A suitable air logic pressure switch which signals 40 psi is available from Air Logic under Model No. F-4100 Series Pressure Switch.

Indicator light 134, shown mounted on T-joint 122, is of a 24-volt type which emits a green light to indicate the presence of oxygen solution under more than 40 psi of pressure in the container, and a red light to indicate 40 psi of pressure therein.

Solenoid valve 126 is electronically connected to suitable means, here referred to as timing and establishing and/or controlling means and shown as a timer/counter 136 which is also connected to flow switch 116. The timer/counter receives the signal(s) from flow switch 116, times, counts and accumulates the duration or period(s) of flow of purified water through the flow switch, and establishes and/or controls the time that the solenoid valve is to be open to flow oxygen solution therethrough. Upon a desired, set period or set periods of total flow time, continually or continuously accumulated, the timer/counter signals the solenoid valve to open it for a set desired period of time, and for that latter time allows the pressurized oxygen solution to flow or be injected from container 109, through solenoid valve 126, into T-joint 122 and hence into the filtered water in or flowing through it.

Thus, the filtered, sterilized water which has been subjected to the oxygen solution, sometimes referred to herein as the oxygenated water, flows through water conduit means, here including the joint of T-joint 122, its left exit flow arm 140, and a suitable connector conduit(s), such as here shown including a 90° elbow ¼ inch plastic tubing 142. Tubing 142, preferably includes a check valve 144 (dashed lines), for providing flow of the oxygenated water from the conduit to additional or continued water flow conduit line(s) (not shown) connected thereto, which feed the water to the dental devices. The check valve allows forward flow through the lines, but prevents backflow of air or water into the aerobic oxygenation or purification system. The check valve is desirable because, for example, when rotary dental drills change the direction of drill rotation they sometimes suck air or water back into the feed lines.

In operation, for example, when a dentist operates a water-cooled drill, the filtered, sterilized water flows from base unit 3 of the filtration system through permeate port 7, and passes through first connector pipe 114 to and through flow switch 1 16. The flow switch transmits a signal or pulse indicating water flow to the timer/counter. This signal remains for the duration of flow. As is known, dental handpieces are operated discontinuously, for different and varied time periods. For example, they may be on for three seconds, off for five, on for six, off for ten, etc. According to the preferred embodiment, timer/counter 136 is set to time, count and accumulate a total of twenty (20) seconds of water flow, and each time a total of twenty seconds of flow has accumulated continually or continuously, the timer/counter sends a signal of two (2) seconds duration to solenoid valve 116 thereby opening it for two (2) seconds. This two second period allows or releases one drop, approximately 0.43 ml of oxygen solution to be injected under pressure from container 109 to the T-joint to treat, i.e., oxygenate, the purified water thereat or flowing therethrough. The oxygenated purified water effluent flows through and from the second conduit here including the T-joint left hand exit arm, and through connector 142, the latter of which is connected to one or more suitable water line(s) (not shown) for feeding the oxygenated water to the dental handpieces or other means for use of the water externally or internally on or in dental, medical or other patients or living entities.

From the above, it can be seen that the water purification system can comprise: (a) a main shut-off valve; (b) a replaceable integrated aqueous liquid or water filtration and sterilization cartridge and housing assembly which is capable of removing particulates, organic materials, inorganic materials and/or heavy metal materials from a water stream, while also sterilizing the filtered water stream to destroy most microorganisms, bacteria and viruses contained therein; and (c) a means for injecting at least about 0.2 wt. % of an oxygen solution into the purified water, thereby eliminating the formation of biofilm in the water supplied to dental units or instruments, or other devices requiring uncontaminated water. The means for injecting at least about 0.2 wt. % of an oxygen solution into the treated, purified water may be a single stage injector with a wide-mouth wash bottle operated on low flow. The apparatus is capable of injecting at least about 0.2 wt. % of an oxygen solution into the purified water so as to eliminate the formation of any biofilm within the water lines connecting the ultraviolet filtration assembly to the dental devices.

In accordance with the invention, the amount of oxygen solution which is employed is an amount which is sufficient to remove biofilm already present on the conduit surface, i.e., its interior surface, and to prevent the formation of biofilm on the surface. It has been found that the average flow of common dental handpieces such as drills employing either ¼ or ⅛ inch water feed lines, is about 100 ml/min., and for that rate of flow, about 0.43 ml of oxygen solution, about one drop from container 109, for every twenty seconds of flow has been found sufficient to eliminate biofilm existing in the feed lines, and to prevent biofilm from forming or accumulating in such feed lines. Although for this application, more solution can be injected each twenty seconds, there is no apparent significant benefit or harm in employing more than one drop every twenty seconds of water flow. The timing and amount of oxygen solution to be injected or provided to the purified water is that which is sufficient to achieve the objectives of the invention. It is understood that one should take into consideration various factors such as the diameter and length of the conduits and feed lines, the flow rate (e.g., the average flow rate of the water passing through the system), the quality (i.e., purity of the water being treated with the aerobic oxygen), and the weight percent of oxygen in the solution being injected. Although it is preferred that the water to be oxygenated with the oxygen solution be as purified as possible, the water can be pre-purified to any degree by any means or method or not at all. The poorer the quality of the water fed to the oxygenation system, the greater the amount of oxygen will be required to treat the water to eliminate biofilm from the downstream feed lines and to prevent biofilm from forming therein. Given the relatively high cost of the aerobic oxygen solutions and the amounts which would be needed over time, compared to the cost of water purification systems, it is preferred that pre-purification systems be employed and that the water to be treated with the oxygen be as pure as possible.

It is understood that in accordance with the invention, any suitable type, arrangement or combination of components, elements and/or steps can be employed to contact or treat the aqueous liquid, e.g., the water, with oxygen, so long as the oxygen source and oxygen provided safely achieve the objective of removing biofilm from, and preventing biofilm from forming on the interior surface of conduits for aqueous liquids. In accordance with the invention, the preferred method of providing the oxygen is to provide it in an oxygen solution, preferably one which contains stabilized oxygen, oxygen in molecular form. The oxygen molecules can be provided in any suitable form in any suitable amount by any suitable means or method to the aqueous liquid to be treated. Preferably, the stabilized oxygen is provided as or in an oxygen solution which contains stabilized electrolytes of oxygen, most preferably, a high percentage of stabilized electrolytes of oxygen. A preferred oxygen solution containing a high percentage of stabilized electrolytes of oxygen is commercially available under the name Aerobic Oxygen Plus. Aerobic Oxygen Plus is available from the Good For You Corporation, of Calgary, Alberta, Canada. This oxygen solution comprises sodium hydroxide, sodium carbonate, calcium hypochlorite and sodium chlorite. For the dental applications disclosed herein, this as well as the preferred oxygen solution preferably each comprise at least about 0.2% by weight oxygen based on the weight of the solution.

It will be understood that the contacting, treatment, subjection or injection of the oxygen solution into the water need not be effected while the water is flowing through a line or conduit. That is, the contacting with oxygen solutions may also take place when the water is stationary or relatively stationary. For example, the contacting can be effected while the water is in a holding vehicle which has a gradual, continuous, continual, or on-demand in feed and/or outflow.

The container or vehicle can be or be part of a water purification unit.

It is known that tests have shown that the total bacterial count of water coming out of dental devices and units, for example out of air/water pistols, turbines, and scalers is well above 500 CFU (Colony Forming Units)/ml, currently the U.S. Government upper limit for drinking water. However, the following examples conducted in accordance with the invention demonstrate that contacting water with an oxygen solution containing stabilized electrolytes of oxygen reduces the total bacterial count to well below 500 CFU/ml.

While several embodiments have been shown and described in accordance with the invention, it is to be clearly understood that the same are susceptible to numerous changes apparent to one skilled in the art. Therefore, the disclosure is not to be limited to the details shown and described. Rather, it is intended to include all changes and modifications which come within the scope of the appended claims.

What is claimed is:

1. A method for removing biofilm from an interior surface of a conduit and for preventing biofilm from forming on said interior surface as a result of flow of an aqueous liquid through said conduit, said method comprising the step of:

contacting said aqueous liquid with an oxygen solution consisting essantially of containing stabilized electrolytes of oxygen in an amount sufficient to remove biofilm from and prevent the formation of biofilm on said interior surface of said conduit.

2. The method of claim 1 further comprising the step of filtering said aqueous liquid prior to contacting it with said oxygen solution.

3. The method of claim 2 further comprising the step of exposing said filtered aqueous liquid to ultraviolet radiation prior to contacting said liquid with said oxygen solution.

4. The method of claim 1 wherein said oxygen solution comprises at least about 0.2% by weight oxygen.

5. The method of claim 4 wherein said contacting step further comprises flowing said aqueous liquid through said conduit at an average rate of about 100 ml/min. and wherein about 0.043 ml of said oxygen solution is added to said aqueous liquid every accumulated total of twenty (20) seconds of flow of said aqueous liquid through said conduit.

6. The method of claim 5 wherein said about 0.043 ml of oxygen solution is added under at least about 40 psi of pressure for a period of about two (2) seconds per said twenty (20) seconds of flow.

7. The method of claim 1 wherein said conduit is capable of feeding said aqueous liquid to a dental instrument.

8. The method of claim 1 wherein said oxygen solution comprises sodium hydroxide, sodium carbonate, calcium hypochlorite and sodium chlorite.

9. An apparatus for removing biofilm from an interior surface of a conduit and for preventing biofilm from forming on said interior surface as a result of flow of an aqueous liquid through said conduit, said apparatus comprising:

means for filtering said aqueous liquid;

means for exposing said aqueous liquid to ultraviolet radiation downstream from said means for filtering; and means for contacting said aqueous liquid with an oxygen solution containing stabilized electrolytes of oxygen, downstream from said means for exposing said aqueous liquid to ultraviolet radiation, in an amount sufficient to remove said biofilm from, and prevent said formation of biofilm on, said interior surface of said conduit wherein said means for contacting said aqueous liquid comprises:

means for dispensing said oxygen solution;

a flow monitoring means for monitoring the flow of said aqueous liquid through said conduit; and a flow control means for controlling the amount of said oxygen solution which is dispensed from said mans for dispensing, based upon the flow of said aqueous liquid as monitored by said flow monitoring means.

10. The apparatus of claim 9 wherein said means for dispensing said oxygen solution is a container in which said oxygen solution is pressurized sufficiently to inject said oxygen solution into said conduit.

11. The apparatus of claim 9 further comprising a means for indicating when said means for dispensing said oxygen solution is essentially empty.

12. The apparatus of claim 9 wherein said oxygen solution comprises at least about 0.2% by weight stabilized electrolytes of oxygen.

13. The apparatus of claim 9, wherein said conduit is capable of feeding said aqueous liquid to a dental instrument.

14. A system for removing biofilm from an interior surface of a dental instrument and for preventing biofilm from forming on said interior surface as a result of flow of an aqueous liquid through said dental instrument, said system comprising:

means for filtering said aqueous liquid;

means for exposing said aqueous liquid to ultraviolet radiation downstream from said means for filtering; and means for contacting said aqueous liquid with an oxygen solution containing stabilized electrolytes of oxygen, downstream from said means for exposing said aqueous liquid to ultraviolet radiation, in an amount sufficient to remove said biofilm from, and prevent said formation of biofilm on, said interior surface of said dental instrument wherein said means for contacting said aqueous liquid comprises:

means for dispensing said oxygen solution;

a flow monitoring means for monitoring the flow of said aqueous liquid through said conduit; and a flow control means for controlling the amount of said oxygen solution which is dispensed from said mans for dispensing, based upon the flow of said aqueous liquid as monitored by said flow monitoring means.

* * * * *